(12) United States Patent
Park et al.

(10) Patent No.: US 12,476,803 B2
(45) Date of Patent: Nov. 18, 2025

(54) BLOCKCHAIN-BASED TRUSTED SETUP METHOD FOR ZERO-KNOWLEDGE PROOF AND BLOCKCHAIN NODE USING THE SAME

(71) Applicant: POSTECH RESEARCH AND BUSINESS DEVELOPMENT FOUNDATION, Pohang-si (KR)

(72) Inventors: Chanik Park, Pohang-si (KR); Moon Hyeon Chung, Pohang-si (KR); Dong Hyeon Ryu, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 69 days.

(21) Appl. No.: 18/620,977

(22) Filed: Mar. 28, 2024

(65) Prior Publication Data
US 2025/0023723 A1   Jan. 16, 2025

(30) Foreign Application Priority Data

Jul. 14, 2023 (KR) .................. 10-2023-0091938
Oct. 4, 2023 (KR) .................. 10-2023-0131960

(51) Int. Cl.
   *H04L 9/08* (2006.01)
(52) U.S. Cl.
   CPC .................. *H04L 9/088* (2013.01)

(58) Field of Classification Search
   None
   See application file for complete search history.

(56) References Cited

U.S. PATENT DOCUMENTS 11,882,216 B1 * 1/2024 Xu .................. H04L 9/3218

FOREIGN PATENT DOCUMENTS

KR    10-2103179 B1    4/2020
KR    10-2594655 B1    10/2023

* cited by examiner

*Primary Examiner* — Brandon Hoffman
(74) *Attorney, Agent, or Firm* — Morgan, Lewis & Bockius LLP

(57) ABSTRACT

A blockchain-based trusted setup method for zero-knowledge proof (ZKP), performed by a specific node of a blockchain network, may comprise: transmitting a first hash value of a first common reference string (CRS) to a first node; receiving a second hash value of a second CRS from the first node; transmitting the second hash value to a second node; and receiving a third hash value of a third CRS from the second node, wherein the second CRS is generated by the first node encrypting or hiding the first CRS acquired from a public storage through a CRS update module using a secret key of the first node, and the third CRS is generated by the second node using the second CRS acquired from the public storage and a secret key of the second node.

20 Claims, 7 Drawing Sheets

BLOCKCHAIN-BASED TRUSTED SETUP METHOD FOR ZERO-KNOWLEDGE PROOF AND BLOCKCHAIN NODE USING THE SAME

CROSS-REFERENCE TO RELATED APPLICATIONS

This application claims priority to Korean Patent Application No. 10-2023-0091938, filed on Jul. 14, 2023, and Korean Patent Application No. 10-2023-0131960, filed on Oct. 4, 2023, with the Korean Intellectual Property Office (KIPO), the entire contents of which are hereby incorporated by reference.

BACKGROUND

1. Technical Field

Example embodiments of the present disclosure relate in general to a blockchain-based protocol of a trusted setup process for zero-knowledge proof (ZKP), and more particularly, to a trusted setup method for ZKP utilization based on a non-fungible token (NFT) and a blockchain node using the same.

2. Related Art

Recently, zero-knowledge proof (ZKP) is emerging to enables privacy. Among existing ZKP techniques, zk-SNARK (Zero-Knowledge Succinct Non-interactive Arguments of Knowledge) supports the shortest verification time and the smallest proof size. However, using zk-SNARK requires the execution of trusted setup ceremony in advance. The trusted setup ceremony generates common parameter string (CRS) which is generated on the basis of generators belonging to an elliptic curve group and a randomly generated value.

In trusted setup ceremony, each of a prover and a verifier generates common reference string (CRS). The prover generates a proof with a hidden input that only the prover has, and the verifier verifies and authenticates the proof received from the prover without any additional input from the prover or anyone else. Here, the CRS may be represented as a set of points on an elliptic curve. Currently, an external trusted third party (TTP) is required for the trusted setup ceremony, and due to the presence of such a TTP, the necessity of management, and the like, zk-SNARKs suffer from a severe security vulnerability.

More specifically, ZKP offers enhanced privacy and data compression by concealing confidential data. In this process, the prover generates a proof without transmitting any private data, and the verifier can authenticate the proof without accessing the private data. The utilization of ZKP necessitated the introduction of zk-SNARK in 2011. zk-SNARK can make succinct proof that can be verified with small able at a small computational cost. Unlike interactive zero-knowledge techniques, zk-SNARK needs only one message that has a proof sending from a prover. The verifier can verify the ZKP in a short time without additional data. Using zk-SNARK requires shared information created by trusted setup ceremony. Existing zk-SNARK algorithms share CRS to generate keys utilized by a prover and a verifier, which is created by a TTP during a trusted setup ceremony.

Ensuring the security of the TTP is crucial for the safe use of ZKP, but safeguarding the TTP from security vulnerabilities can be expensive. In 2016, Zcash conducted a trusted setup ceremony involving six individuals in various locations using machines that were entirely disconnected from any network. Zcash is a cryptocurrency or system of a privacy coin that guarantees anonymity. However, the security vulnerability of the TTP remains an unavoidable issue. To address this challenge, it is necessary to devise a trusted setup ceremony that does not rely on a third party.

SUMMARY

Accordingly, example embodiments of the present disclosure are provided to substantially obviate one or more problems due to limitations and disadvantages of the related art.

Example embodiments of the present disclosure provide a blockchain-based protocol for a trusted setup ceremony that does not use a trusted third party (TTP).

Example embodiments of the present disclosure also provide a trusted setup method in which three types of setup protocols are selectively used according to a method of verifying a common reference string (CRS) through a pairing check (PC) with a placement in which a CRS is stored.

Example embodiments of the present disclosure also provide a blockchain node employing the foregoing trusted setup method.

In some example embodiments, a blockchain-based trusted setup method for zero-knowledge proof (ZKP) includes transmitting, by a prover, a ZKP non-fungible token (NFT) identification (ID) to a verifier and recognizing, by the verifier, that a problem of an NFT indicated by the ZKP NFT ID is a problem to be verified and obtaining a CRS from the ZKP NFT connected to the NFT.

The ZKP NFT may be generated when a proving key and a verification key are updated with a new CRS.

The ZKP NFT may manage information on the proving key and the verification key.

The ZKP NFT may have a CRS NFT ID, circuit compiler information, a target function, the proving key, and the verification key.

In other example embodiments, a blockchain-based trusted setup method for ZKP performed by a blockchain node includes transmitting a CRS from the blockchain node to a first user according to a smart contract of a blockchain network, receiving a first CRS, a first proving key, and a first verification key from the first user wherein the first CRS is generated by the first user using his or her secret key and the first proving key and the first verification key are generated by the first user, performing a PC between the CRS and the first CRS, when a result of the PC is true, updating the CRS, the proving key of the blockchain node, and the verification key of the blockchain node with the first CRS, the first proving key, and the first verification key, respectively.

The blockchain-based trusted setup method may further include transmitting the first CRS to a second user, receiving a second CRS, a second proving key, and a second verification key from the second user wherein the second CRS is generated by the second user using his or her secret key and the second proving key and the second verification key are generated by the second user, performing a PC between the first CRS and the second CRS, when a result of the PC is true, updating the first CRS, the first proving key, and the first verification key with the second CRS, the second proving key, and the second verification key, respectively.

In other example embodiments, a blockchain-based trusted setup method for ZKP performed by a blockchain node includes transmitting a first hash value of a first CRS to a first user, receiving a second hash value of a second CRS from the first user wherein the second CRS is generated using the first CRS received from a public storage by the first user and a secret key of the first user, transmitting the second hash value to a second user, and receiving a third hash value of a third CRS from the second user. The third CRS is generated using the second CRS received from the public storage by the second user and a secret key of the second user.

The blockchain-based trusted setup method may further include storing the third hash value and a proving key and a verification key for the third hash value.

In other example embodiments, a blockchain-based trusted setup method for ZKP performed by a blockchain node including a first user terminal includes reading a CRS from a public storage, reading a commitment of the CRS from a CRS NFT of a blockchain network, updating the CRS using a calculation module, generating a proving key and a verification key using the calculation module, and writing the updated CRS and the keys in the CRS NFT of the blockchain network and a ZKP NFT.

The blockchain-based trusted setup method may further include providing data of the CRS NFT and the ZKP NFT to the second user. Here, the second user may independently check the updated CRS and a generated secret key using only the data of the CRS NFT and the ZKP NFT.

The second user may be a prover or verifier who uses ZKP and may prove or verify a problem using the proving key or verification key in the ZKP NFT without communication.

The calculation module may include a CRS update module configured to update the CRS as a new CRS by encrypting the CRS using a secret key of each user, a CRS ZKP module configured to generate the ZKP using the proving key or verify the ZKP using the verification key, and a key generation module configured to generate the proving key and the verification key using the CRS and a circuit. Here, the circuit may include a program that requires proof of valid execution.

The blockchain network may further include an NFT creation smart contract. Here, the NFT creation smart contract may comply with NFT-standard-compliant contracts of Ethereum Request for Comment (ERC)-721.

The CRS NFT and the ZKP NFP may be read-only NFTs.

The CRS NFT may manage CRS information and may be generated for the new CRS when the CRS is updated.

The CRS NFT may store the commitment of the CRS including a hash value of the CRS.

The CRS NFT may include information on the CRS update module, a previous CRS commitment, a public storage address of the previous CRS, an updated CRS commitment, a public storage address of the updated CRS, and information on a contributor's identity.

The ZKP NFT may be generated when the proving key and the verification key are updated using the new CRS.

The ZKP NFT may manage information on the proving key and the verification key.

The ZKP NFT may have a CRS NFT ID, circuit compiler information, a target function, the proving key, and the verification key.

In other example embodiments, a blockchain node includes a memory configured to store at least one instruction and a processor connected to the memory. As a device for implementing a blockchain-based trusted setup method for ZKP, the processor performs, due to the at least one instruction, operations of: transmitting, by a prover, a ZKP NFT ID to a verifier; and recognizing, by the verifier, that a problem of an NFT indicated by the ZKP NFT ID is a problem to be verified and obtaining a CRS using ZKP NFT connected to the NFT.

In other example embodiments, a blockchain node includes a memory configured to store at least one instruction and a processor connected to the memory. As a device for implementing a blockchain-based trusted setup method for ZKP performed by a blockchain node, the processor performs, due to the at least one instruction, operations of: transmitting a CRS from the blockchain node to a first user according to a smart contract of a blockchain network; receiving a first CRS, a first proving key, and a first verification key from the first user wherein the first CRS is generated by the first user using his or her secret key and the first proving key and the first verification key are generated by the first user; performing a PC between the CRS and the first CRS; when a result of the PC is true, updating the CRS, the proving key of the blockchain node, and the verification key of the blockchain node with the first CRS, the first proving key, and the first verification key, respectively.

In other example embodiments, a blockchain node includes a memory configured to store at least one instruction and a processor connected to the memory. As a device for implementing a blockchain-based trusted setup method for ZKP performed by a blockchain node, the processor performs, due to the at least one instruction, operations of: transmitting a first hash value of a first CRS to a first user; receiving a second hash value of a second CRS from the first user wherein the second CRS is generated using the first CRS received from a public storage by the first user and a secret key of the first user; transmitting the second hash value to a second user; and receiving a third hash value of a third CRS from the second user. The third CRS is generated using the second CRS received from the public storage by the second user and a secret key of the second user.

In other example embodiments, a blockchain node includes a memory configured to store at least one instruction and a processor connected to the memory. As a device for implementing a blockchain-based trusted setup method for ZKP performed by a blockchain node including a first user terminal, the processor performs, due to the at least one instruction, operations of: reading a CRS from a public storage; reading a commitment of the CRS from a CRS NFT of a blockchain network; updating the CRS using a calculation module; generating a proving key and a verification key using the calculation module; and writing the updated CRS and the keys in the CRS NFT of the blockchain network and a ZKP NFT.

According to the present disclosure, it is possible to provide a decentralized method for performing a trusted setup ceremony for a zk-SNARK without a TTP.

In other words, when initial coordinate information is given, a blockchain node may define a method of calculating follow-up coordinates and a placement for storing result coordinates using a participant's contribution for a trusted setup ceremony and analyze three types of setup ceremony protocols employing a blockchain. Here, a CRS is generated and updated during a trusted setup ceremony. Accordingly, a setup ceremony protocol of the present disclosure can be used for an initialization operation in a cutting-edge zk-SNARK algorithm, such as Groth16, and applied to a computational model with a certain proof length and verification time without any limitations.

Also, considering that EIP-4519 sets up a security channel between two users, when the EIP-4519 extension protocol is advanced on the basis of the setup ceremony protocol of the present disclosure, it is possible to eliminate the necessity for verification. In other words, the present disclosure can contribute to enhancement of EIP-4519 extension and implementation of a trusted setup ceremony in the Ethereum ecosystem.

DETAILED DESCRIPTION OF THE EMBODIMENTS

Figure 1:
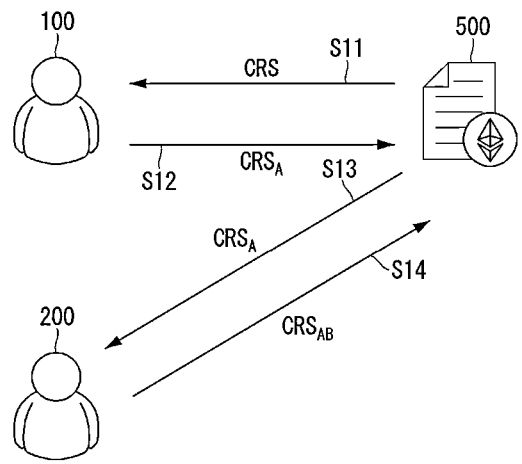
FIG. 1 is an example diagram illustrating a naive protocol with an on-chain PC function that may be employed in a trusted setup method according to an example embodiment of the present disclosure.

While the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

The present disclosure provides a trusted setup ceremony for zero-knowledge proof (ZKP) that does not require a trusted third party (TTP). In other words, TTPs are removed from the trusted setup ceremony of the present disclosure, and the function of a TTP is replaced with a smart contract of a blockchain.

A blockchain may be a system in which multiple nodes are connected in a peer-to-peer (P2P) network to process users' transactions. A record on transactions in a blockchain may be checked using a distributed ledger or database which is sequentially stored. Once a transaction is recorded on a blockchain, the transaction is unchangeable. A blockchain records the content of a transaction by concatenating the content into a chain of blocks. At this time, an electronic signature which is a public-key cryptographic algorithm and a hash function may be used to authenticate transactors and ensure transaction integrity.

ZKP has two entities, a prover and a verifier. The prover is a user who claims to possess a solution to a given problem without revealing the exact solution itself. On the other hand, the verifier is a user who wants to verify that a prover knows a solution to a given problem. ZKP satisfies three properties, completeness, soundness, and zero-knowledge.

Here, completeness represents "If the solution of the problem is true, then a prover can convince a verifier". Soundness represents "False prover cannot convince a verifier of a false solution". Also, zero-knowledge represents "a verifier only knows that the prover knows the solution of the problem is true and nothing else."

There are two types of ZKP models, interactive model and non-interactive model. In the interactive model, the verifier asks questions that can be solved if the prover has a knowledge of the solution to the problem, and in response, the prover answers the question. In the non-interactive model, the prover sends a proof and a verifier verifies the proof without further communication with the prover. For the non-interactive model, trusted setup is needed between the prover and the verifier.

A zk-succinct non-interactive arguments of knowledge (SNARK) is a non-interactive ZKP model for general problems with a succinct proof. Before generating the proof, a common reference string (CRS) should be created and shared between a prover and a verifier in advance via a trusted setup ceremony. The trusted third party (TTP) is typically required to execute the trusted setup ceremony.

A zk-SNARK algorithm that do not need TTP for the trusted setup ceremony are called a transparent zk-SNARK. Most of the existing transparent zk-SNARK are limited to specific computational model. For example, Hyrax is limited to data-parallel circuits, Bulletproofs are limited to arithmetic circuits, and a scalable transparent argument of knowledge (STARK) is limited to a uniform circuit. Here, Hyrax is a technique for applying the Fiat-Shamir heuristic which assumes the presence of the random program "random oracle" to a random oracle model to generate a zk-SNARK on the basis of the discrete logarithm assumption.

Also, for example, Fractal is not limited to specific computational model but it is slower than other algorithms. Specifically, Fractal' prover time is $O(n \log n)$, the verifier time is $O(\log^2 n)$, and a proof length is $O(\log^2 n)$, where n is the number of elliptic points on the elliptic curve in CRS. As described above, existing transparent zk-SNARK algorithms do not match the efficiency of non-transparent algorithms in terms of proof verification time and proof size.

Meanwhile, the trusted setup ceremony, facilitated by a TTP, is conducted to generate shared data. The Powers-of-Tau represents a specific type of the trusted setup ceremony, and is used to generate initial parameters for zk-SNARKs and the like. Contributors or participants in the Powers-of-Tau sequentially update the trusted setup using their unique secret keys. A contributor receives the preceding CRS and verifies the validity of the previous update. If the previous update is deeded valid, the contributor computes a new CRS using their secret key. The security of the Powers-of-Tau ceremony is predicated as long as at least one contributor does not disclose the secret key used in the trusted setup ceremony. Although the security of both trusted setup ceremonies is enhanced with an increase in the number of contributors, it is imperative to assess the trustworthiness of each contributor.

For this reason, the present embodiment provides a trusted setup ceremony in which no TTP is required and it is unnecessary to assess the trustworthiness of each participant. Unlike existing zk-SNARKs in which a TTP is required for a trusted setup ceremony, in a trusted setup ceremony (or "trusted setup protocol") of the present embodiment, a TTP is replaced with a smart contract, and ZKP is performed through a CRS generation process or a CRS update process using a non-fungible token (NFT). In other words, in the trusted setup ceremony of the present embodiment, a proving key and a verification key may not be directly transmitted between a prover and a verifier but may be recorded on a ZKP NFT of a blockchain and viewed by all nodes in the network. According to such a configuration, in the trusted setup ceremony of the present embodiment, the trusted setup ceremony of ZKP, particularly, a zk-SNARK, can be effectively performed by calculating and sharing a CRS and generating and managing a CRS NFT and a ZKP NFT without using a TTP.

Here, the smart contract may be in the form of an endlessly repeated script that implements a written contract as code and fulfills the contract when a specific contractual condition is satisfied. Also, the smart contract may be defined as at least a part of a system that records a transaction between contracting parties in code, uploads the code to a blockchain, and automatically fulfills the contract when the terms of the contract are satisfied. In other words, in the present embodiment, the smart contract may be configured to generate a CRS NFT and generate a ZKP NFT on the basis of the CRS NFT. Here, the CRS NFT may be generated when participants transmit and receive the smart contract and the CRS or a hash value of the CRS, and may include the hash value of the CRS and a hash value of a problem for updating the CRS or an external storage address (ESA) of a public storage in which the program is stored. The ZKP NFT may be configured to store or manage the proving key and the verification key for the CRS.

Further, a trusted setup device of the present embodiment may also support zk-scalable transparent arguments of knowledge (STARKs) which are another form of ZKP. Zk-STARKs are another type of non-interactive ZKP protocol developed by Stark Ware in 2018 and enhance the integrity of blockchain calculations and the protection of personal information using new cryptographic proofs and modern algebra. When a zk-STARK is used, a blockchain calculation may be moved to a single off-chain prover (also referred to as a "STARK prover"), and then the integrity of the calculation may be verified using an on-chain verifier (also referred to as a "STARK verifier"). Also, a zk-STARK generates an initial parameter or common parameter using randomness which is publicly available and thus does not require a trusted initial setup ceremony. Accordingly, the trusted setup device of the present embodiment can have an integrated device structure that selectively supports zk-STARKs while basically supporting zk-SNARKs.

As described above, the present disclosure provides a trusted setup ceremony in which nodes of a blockchain network authenticate transactors and ensure transaction integrity to prove the corresponding transaction. When initial coordinate information of elliptic curve cryptography that may be employed in the trusted setup ceremony is given, nodes participating in a blockchain network (hereinafter "communication nodes" or "blockchain nodes") can define a method of calculating follow-up coordinates and a placement for storing result coordinates using a participant's contribution for the trusted setup ceremony.

In particular, the key concepts of an on-chain pairing check (PC) and an off-chain PC with a data availability placement in a blockchain-based trusted setup ceremony are defined as follows. A data availability placement represents whether a user can receive all data from the blockchain or whether an external storage is necessary. When a PC is performed in the blockchain, the PC becomes an on-chain PC, and when a PC is performed out of the blockchain, the PC becomes an off-chain PC. According to these definitions, the complexity of three types of trusted setup protocols may be analyzed using the computational cost and on-chain storage space cost of a CRS PC.

First, the foregoing three types of trusted setup protocols will be described below.

FIG. 1 is an example diagram illustrating a naive protocol with an on-chain PC function that may be employed in a trusted setup method according to an example embodiment of the present disclosure.

Referring to FIG. 1, the naive protocol of the present embodiment may indicate a naive CRS update protocol with the on-chain PC function. A trusted setup device employing the naive protocol may be installed in at least one of a first node 100 and a second node 200. The first node 100 or the second node 200 is configured to update a CRS between the first node 100 and the second node 200 using a smart contract 500 of a blockchain network so that the counterpart can verify that the first node 100 or the second node 200 has information, such as a secret key or the like, due to the updated CRS without disclosing the information or performing an on-chain interaction with the counterpart. The foregoing smart contract may be referred to as an "NFT creation smart contract."

Specifically, in the case of updating a specific point which is an element of an elliptic curve group recorded in the CRS for ZKP, each of the nodes 100 and 200 may first request information or coordinates of points written in the smart contract 500 from the blockchain. Here, the CRS is a set or list of points on two elliptic curves g1 and g2. The CRS may be initialized using three points identified on the first elliptic curve g1. In the foregoing case, the CRS may be transmitted from the blockchain network to a node corresponding to a specific user terminal, for example, the first node 100 with the fulfillment of the contract, that is, when the terms of the smart contract 500 uploaded to the blockchain network are satisfied (S11).

After the CRS is received, the first node 100 generates a new first CRS $CRS_A$ using its own secret keys SA, CA. After that, the first node 100 may generate a first proving key $pk_A$ and a first verification key $vk_A$ to be used for a zk-SNARK and transmit the generated keys to the smart contract 500 together with the first CRS $CRS_A$ (S12).

The smart contract 500 performs a pairing check between the CRS prestored in the smart contract 500 and the first CRS $CRS_A$ received from the first node 100. When true is returned as a result of the pairing check, the smart contract 500 updates the CRS, a prestored proving key, and a prestored verification key with the first CRS $CRS_A$, the first proving key $pk_A$, and the first verification key $vk_A$, respectively.

The second node 200 which is a node corresponding to a follow-up user terminal may repeat the CRS update process in the same way as the first node 100 corresponding to a previous user terminal. In other words, the second node 200 may receive the first CRS $CRS_A$ from the smart contract 500 (S13).

After the first CRS $CRS_A$ is received, the second node 200 generates a new second CRS $CRS_{AB}$ using its own secret keys $s_B$ and $\alpha_B$. After that, the second node 200 may generate a second proving key $pk_B$ and a second verification key $vk_B$ to be used for a zk-SNARK and transmit the generated keys to the smart contract 500 together with the second CRS $CRS_{AB}$ (S14).

The smart contract 500 may perform a pairing check between the stored first CRS $CRS_A$ and the second CRS $CRS_{AB}$ submitted by the second node 200. When true is returned as a result of the pairing check, the smart contract 500 updates the first CRS $CRS_A$, the first proving key $pk_A$, and the first verification key $vk_A$ with the second CRS $CRS_B$, the second proving key $pk_B$, and the second verification key $vk_B$, respectively.

As described above, the naive protocol with the on-chain pairing check function ensures the integrity of a trusted setup process by performing a pairing check between a CRS prestored in the smart contract 500 and a CRS received from each node and thus does not require a TTP. In other words, unless all nodes in a network publicize secret keys, the naive protocol is safe. Here, a pairing check is performed in the blockchain by the smart contract 500 and thus may be defined as an "on-chain" pairing check.

Looking at the pairing check in more detail, the pairing check is the process of verifying that a user's CRS update is valid. The pairing check may be true when all three equations in Expression 1 below are satisfied.

$$e\left(g_1^{s_{User}^i}, g_2\right) = e\left(g_1, g_2^{s_{User}^i}\right)$$
$$e\left(g_1^{\alpha_{User}}, g_2\right) = e\left(g_1, g_2^{\alpha_{User}}\right)$$
$$e\left(g_1^{\alpha_{User} \cdot s_{User}^i}, g_2\right) = e\left(g_1, g_2^{\alpha_{User} \cdot s_{User}^i}\right)$$

[Expression 1]

In Expression 1, e(x, y) represents the relation of (x, y) which is an ellipse pair between points on an elliptic curve, and i is the number of points for the assumption that there is a trusted setup in a CRS. $S_{User}^i$ and $\alpha_{User}$ are secret keys of a user. $g_1^{s_{User}^i}$ is a first ellipse for a secret key (refer to '1a-secret key' below) $S_{User}^i$ having i CRS points, and $g_2^{s_{User}^i}$ is a second ellipse for the 1a-secret key $S_{User}^i$ having the i CRS points. $g_1^{\alpha_{User}}$ and $g_2^{\alpha_{User}}$ are a first ellipse and a second ellipse for a secret key (refer to '1b-secret key' below) $\alpha_{User}$ of each user. $g_1^{\alpha_{User} \cdot s_{User}^i}$ and $g_2^{\alpha_{User} \cdot s_{User}^i}$ are a first ellipse and a second ellipse for the product of the 1a-secret key and the 1b-secret key of a user having i CRS points, respectively.

While on-chain pairing check verifies the CRS update by a user, the computational cost for the pairing check between CRSs is important. For example, nodes participating in the blockchain network of the present embodiment may be configured to anticipate the computational cost by calculating the gas cost in Ethereum. With a Barreto-Naehrig 128 (BN128) elliptic curve, pairing check is calculated as follows in Ethereum Improvement Proposal (EIP)-1108: reduce alt_bn128 precompile gas costs. The pairing check may be represented as shown in Expression 2 below.

$$34000 * (2i + 1) + 45000$$

[Expression 2]

In Expression 2, 34,000 is pairing check cost for comparing points on an elliptic curve, i is the number of points included in a CRS, and 45,000 is a cost for other operations.

Since on-chain pairing check stores the CRS in blockchain, the cost for an on-chain storage, that is, a storage cost, is expected to correspond with the size of the CRS. In Ethereum, the cost is 640,000 gas per 1 KB and the size of an elliptic curve point is 64 Byte. The size of proving key and verification key are 256 Byte each. If all data is stored in on-chain storage, the storage cost for saving CRS, proving key, and verification key is as shown in Expression 3 below.

$$40000 * i + 320000$$

[Expression 3]

In Expression 3, 40,000 is a storage cost for saving a point on an elliptic curve, and 320,000 is a storage cost for saving eight points to be used for verifying ZKP.

With regard to gas value, in 2023.05, 1 gas is 15 gigawei (gwei) and 1 Ethereum (ETH) is approximated as $1,800. The number of ellipse points required for CRS in Ethereum to express general transactions is approximately 4,000, or specifically, 4,096. Assuming the number of elliptic points for CRS is 4,000, the computation gas cost is $8,616 and the storage gas cost is $4,442. These costs should be paid for each contributor who joins trusted setup ceremony.

Also, the setup protocol of the present embodiment may employ an Ethereum Improvement Proposal (EIP) which is the key protocol specifications of Ethereum. In other words, the setup protocol may be used as an EIP-4519 extended CRS update protocol with off-chain pairing check. It is anticipated that both computational cost and storage cost are thousands of dollars when the number of points for CRS is in the thousands. Therefore, according to the setup protocol of the present embodiment, the CRS update protocol may be first changed to EIP-4519: non-fungible tokens tied to physical assets. And then, an off-chain pairing check may be performed to reduce the computational cost. In other words, the setup protocol of the present embodiment may be extended EIP-4519.

EIP-4519 standardizes an interface for NFTs that represent physical assets, specifically Internet of Things (IoT) devices. The owner or user of physical assets will setup a secure channel with EIP-4519 NFT in the blockchain. The owner or user and the asset create new secret key that is multiplication of one's secret key and the other's public key. After this computation, the owner or user may establish a secure channel that shares newly created secret key, which is known exclusively to them.

As described above, according to the setup protocol of the present embodiment, after EIP-4519 is implemented, two entities may create a new shared secret key. In other words, when EIP-4519 is extended to a trusted setup setting, secret keys (SAB, CAB) may be created between a first node (or user A) and a second node (or user B). After this creation, a CRS, a proving key, and a verification key may be sent to EIP-4519 NFT that manages trusted setup. When a new user C (or a third node) intends to update CRS with user B, the most recent node (the most recent user) to update, written in the EIP-4519 NFT, will connect with the new node and create another secret key ($s_{B'C}$, $\alpha_{B'C}$) from CRS of new user C.

Although the trusted setup method has been described on the basis of two entities in the foregoing embodiment, the present disclosure is not limited thereto. The trusted setup method of the present disclosure may be applied to three or more entities and is equally applicable to the two other setup protocols described below.

Figure 2:
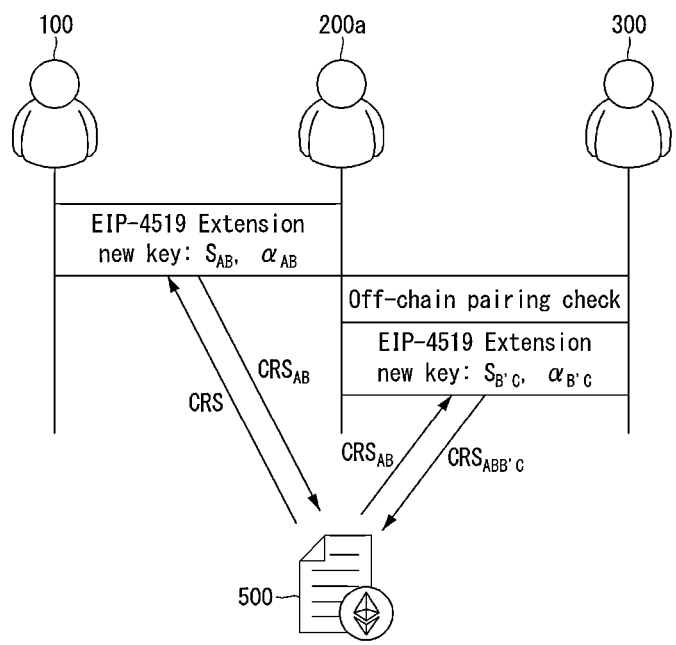
FIG. 2 is an example diagram of an EIP-4519 extension procedure with an off-chain PC function that may be employed in a trusted setup method according to an example embodiment of the present disclosure.

FIG. 2 is an example diagram of an EIP-4519 extension procedure with an off-chain pairing check that may be employed in a trusted setup method according to an example embodiment of the present disclosure.

The computational gas cost calculations mentioned above indicates that an on-chain pairing check is too expensive to be used, and therefor, an off-chain pairing check scheme that does not require a trusted third party is proposed. Pairing check is conducted off-chain by the users who updates CRS. The user should send a proof that guarantees the valid CRS update to EIP-4519 NFT. This is achieved by serial pairing checks with all recorded CRSs by the new user. In FIG. 2, new user D have to conduct two pairing checks (CRS, $CRS_{AB}$), ($CRS_{AB}$, $CRS_{ABB'C}$) to verify the validity of CRSs.

Here, a setup protocol may be configured so that two pairing checks (CRS, $CRS_{AB}$), ($CRS_{AB}$, $CRS_{ABB'C}$) may be conducted by a fourth node (or user D) to verify the validity of a CRS.

As an example, a first node 100 and a second node 200a may generate secret keys SAB, CAB, which are new keys, therebetween through EIP-4519 extension and perform a setup ceremony. Here, a smart contract of the blockchain network may transmit a CRS to any one node, receive another $CRS_{AB}$ from the other node, and perform a CRS update through a pairing check with the prestored CRS.

During the process in which the second node 200a and a third node 300 perform a trusted setup ceremony, new secret keys $S_{B'C}$, $\alpha_{B'C}$ may be generated between the second node 200a and the third node 300 through EIP-4519 extension in an off-chain pairing check system to perform a setup ceremony. During the setup ceremony, a fourth node including a smart contract 500 may send the $CRS_{AB}$ to the third node 300, receive another $CRS_{ABB'C}$ from the third node 300, and update the $CRS_{AB}$ with the $CRS_{ABB'C}$ through a pairing check with the prestored $CRS_{AB}$.

More specifically, the gas cost calculated through the foregoing calculation is too high to use for an on-chain pairing check. Accordingly, in the setup protocol according to the present embodiment, an off-chain pairing check system that does not require a TTP may be used. In other words, a pairing check may be performed off the chain by a node which updates a CRS. For example, the third node 300 which updates a CRS may be configured to provide evidence that ensures a valid CRS update for an EIP-4519 NFT. This represents that a new node can verify the evidence through a serial pairing check with all coordinates recorded in a smart contract.

Although off-chain pairing check is performed by the user, its computational cost for the pairing check is 0. However, even though the pairing check is done by user, CRSs should be stored in the storage available for the new user.

Meanwhile, CRSs should be stored in the storage available for the new user. As CRSs are stored on-chain, the storage cost for the EIP-4519 extension with off-chain pairing check is same as naive CRS update protocol with the on-chain pairing check. When the number of points in a CRS is 4,000, the storage cost for the EIP-4519 extension with the on-chain pairing check may be $4,442.

Figure 3:
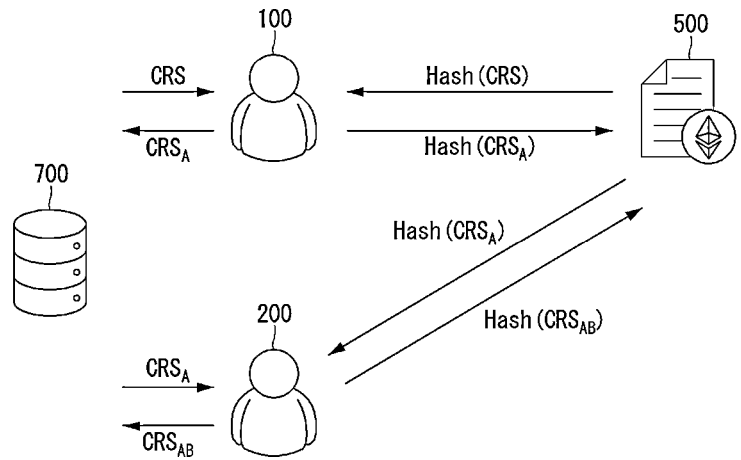
FIG. 3 is an example diagram of a naive protocol with an off-chain PC function that may be employed in a trusted setup method according to an example embodiment of the present disclosure.

FIG. 3 is an example diagram of a naive protocol with an off-chain pairing check function that may be employed in a trusted setup method according to an example embodiment of the present disclosure.

Referring to FIG. 3, an off-chain naive protocol is the naive CRS update protocol with the off-chain pairing check and may be configured to use an off-chain data storage, such as GitHub, interplanetary file system (IPFS), or the like, to reduce the storage cost.

In this case, a trusted setup device may be configured to not only save CRSs in a smart contract of a blockchain network but also store the naive CRS in an accessible public storage 700 while only processing a hash value of the CRS in an on-chain block during a trusted setup ceremony. A node may trust the CRS stored in the public storage 700 and use the CRS for ZKP by comparing a hash value of data stored in the public storage 700 with a hash value stored in a smart contract 500.

More specifically, for example, the first node 100 may receive a CRS from the public storage 700 and receive a hash value Hash(CRS) of the CRS from the smart contract 500. The first node 100 may generate a new CRS ($CRS_A$)

using its secret key and then store the generated $CRS_A$ in the public storage 700. After that, the first node 100 may send a hash value Hash($CRS_A$) of the $CRS_A$ to the smart contract 500.

Similarly, the second node 200 may receive the $CRS_A$ from the public storage 700 and receive the hash value Hash($CRS_A$) of the $CRS_A$ from the smart contract 500. The second node 200 may generate a new CRS ($CRS_{AB}$) using its secret key and then store the generated $CRS_{AB}$ in the public storage 700. After that, the second node 200 may send a hash value Hash($CRS_{AB}$) of the $CRS_{AB}$ to the smart contract 500.

The smart contract 500 may store the final hash value Hash($CRS_{AB}$) which has been updated from Hash(CRS) through Hash($CRS_A$), and a proving key $pk_{AV}$ and a verification key $vk_{AV}$ for the final hash value Hash($CRS_{AB}$).

In the foregoing trusted setup ceremony, a computational cost for pairing check is 0 as off-chain pairing check is done by the user. As only hash values of the CRSs are stored on-chain, the storage cost is reduced to 1% or less. For example, using IPFS (InterPlanetary File System), a 256 KB size block is represented by a 256 Byte hash value, further reducing the storage cost to 0.1%.

The foregoing three trusted setup protocols with computational cost and storage cost will be compared below.

Each of the trusted setup protocols may be based on assumptions on the number of elliptic curve points being 4,000, the price of 1 Ethereum (ETH) at $1,800, and 1 gas at 15 gwei. Here, calculations are expressed in dollars. The computational cost for pairing check is $ (2.15*i+2.7), and the storage cost is $ (1.105*i+17.6). The time for pairing check is 2 ms per point, as measured by an AMD Ryzen 7 2700×8-core.

Cost analysis results of the foregoing three setup protocols are shown in Table 1 below.

TABLE 1

| Trusted setup protocols | Naive protocol, on-chain | EIP-4519 extension, off-chain | Naive protocol, off-chain |
| --- | --- | --- | --- |
| Number of pairing checks | 2i | 2i × (N − 1) | 2i × (N − 1) |
| Pairing check time | Several seconds (8 seconds for i = 4,000) | Off-chain | Off-chain |
| Gas cost (pairing check) | Unaffordable ($8,616 for i = 4,000) | 0 | 0 |
| Gas cost (storage) | Unaffordable ($4,442 for i = 4,000) | Unaffordable ($4,442 for i = 4,000) | $17.6 |
| Total | Unaffordable ($13,056 for i = 4,000) | Unaffordable ($4,442 for i = 4,000) | $17.6 |

In Table 1, N is a natural number of 3 or more. As shown in Table 1, Naive protocol with on-chain pairing check has the least number of pairing checks. Naive protocol with on-chain is not said that this protocol is the fastest since EIP-4519 extension and Naive protocol with off-chain perform pairing check off-chain.

The gas cost for pairing check is very high and unaffordable in Naive protocol with on-chain pairing check. Also, the gas cost for an on-chain storage is very high and unaffordable in the EIP-4519 extension with off-chain pairing check. As shown in the total row, the only trusted setup protocol that is affordable in Ethereum is Naive protocol with off-chain pairing check, using a public storage.

Figure 4:
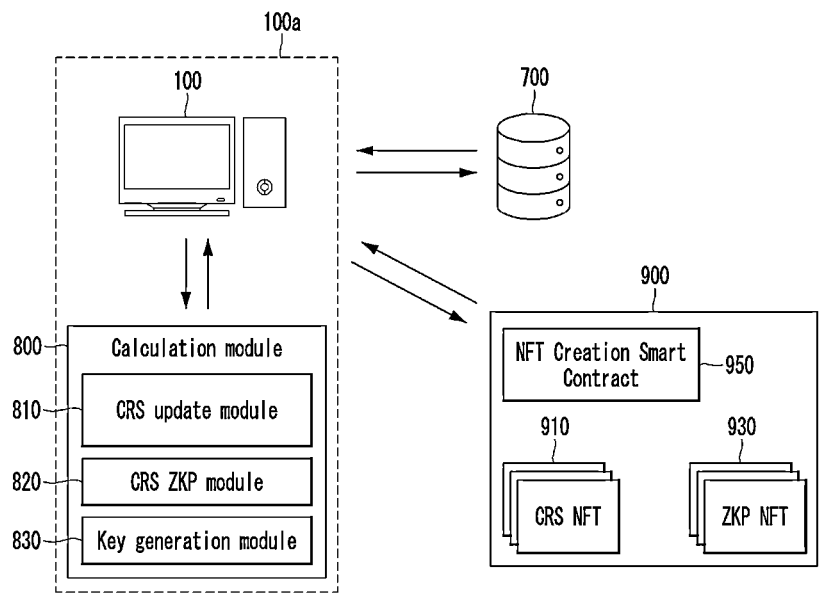
FIG. 4 is a schematic diagram of the architecture of a trusted setup framework for implementing a blockchain-based trusted setup method according to an example embodiment of the present disclosure.

FIG. 4 is a schematic diagram of the architecture of a trusted setup framework for implementing a blockchain-based trusted setup method according to an example embodiment of the present disclosure.

Referring to FIG. 4, the trusted setup framework may include a node 100, a public storage 700, a calculation module 800, and a blockchain network 900 to provide a new trusted blockchain-based setup system with no TTP through various protocols and cost analysis. The public storage may be referred to as an external storage, and the calculation module may be referred to as an external calculation module.

Describing each component in further detail, first, the node 100 may be implemented as a processor or a computing device including a processor and referred to as a communication node. The node 100 may be a participant or contributor to the trusted setup ceremony and may also be a prover or verifier using ZKP. When a contributor intends to update CRS, the contributor may read CRS from the public storage 700 and the commitment of CRS from CRS NFT 910 in the blockchain network 900. Subsequently, the node 100 as the contributor may uses off-chain calculation module 800 to update CRS and generate proving key and verification key. In the blockchain network 900, the updated CRS and the keys may be written in a new CRS NFT 910 and ZKP NFT 930.

Other nodes of the blockchain network 900 can independently verify the updated CRS and the generated secret keys using only the data in both NFTs off-chain. For provers and verifiers using ZKP, they may use proving key and verification key in same ZKP NFT without any additional communication therebetween.

The calculation module 800 may include, as an off-chain calculation module, three modules, a CRS update module 810, a ZKP module 820, and a key generation module 830. In FIG. 4, the ZKP module is expressed as a CRS ZKP module. The calculation module 800 may be implemented as at least one node in the blockchain network but is not limited thereto. At least some components of the calculation module 800 may be integrated with the node 100 or at least one other node in the blockchain network.

In the calculation module 800, the CRS update module 810 may modify the CRS into a new CRS, encrypted by the user's secret key. CRS update may involve thousands of elliptic curve additions and multiplications, both arithmetic operations demand considerable computational cost.

The ZKP module 820 may be configured to create a zero-knowledge proof using the proving key and verify the zero-knowledge proof using the verification key. To this end, the ZKP module 820 may include a ZKP generation submodule and a ZKP verification submodule.

The key generation module 830 may generate both the proving key and the verification key using CRS and a circuit that represents the program requiring proof of valid execution. In other words, the circuit may be configured to use a key generation protocol of a random digital signature.

The blockchain network 900 may include a CRS NFT 910, a ZKP NFT 930, and an NFT creation smart contract 950.

The CRS NFT 910 and the ZKP NFT 930 are read-only NFTs. The NFT creation smart contract 950 may not modify the CRS NFT 910 or the ZKP NFT 930 but may modify the metadata thereof. The NFT creation smart contract 950 may be configured to comply with NFT-standard-compliant contracts of Ethereum Request for Comment (ERC)-721 as a kind of a smart contract.

The CRS NFT 910 may manage CRS information and may be created when CRS is updated. Since CRS is too large to store on the blockchain, the CRS NFT 910 may store a commitment of CRS, such as the hash value of the CRS. The CRS NFT 910 may contain information for a CRS update module, a previous CRS commitment, a public storage address of the previous CRS, an updated CRS commitment, a public storage address of the updated CRS, and the contributor's identity.

The ZKP NFT 930 may be created when the proving key and the verification key are updated with new CRS. The ZKP NFT 930 may manage both key information. To generate keys, the key generation module 830 may need CRS and a circuit with respect to the program. The program may be a specific user program.

Also, the ZKP NFT 930 may have a CRS NFT identification (ID), circuit compiler information, a target function, the proving key, and the verification key. To verify these key generations, a user of a related node can create keys with the ZKP NFT 930. All information for generating keys may be included in the ZKP NFT 930.

In the trusted setup method of the present embodiment, each participant in the blockchain network may have contributor information about who has created an NFT, the CRS NFT 910 may have information about who has performed a CRS update, and the ZKP NFT 930 may have information about who has generated secret keys pk, vk.

Also, CRS update logic may be program information used for CRS updates. The original code of a CRS update program (CUP) may be stored in the external public storage 700, and a hash value of the code data instead of the original code may be stored in the CRS NFT 910. In other words, since CRS may be updated by the CRS update module 810 of the calculation module 800, information of the CRS update module 810 may be stored in the external public storage 700.

Also, the CRS information is information on the stored CRS and may have a placement of the external public storage 700 in which the original is stored and the hash value of the CRS. The placement of the external public storage 700 may correspond to an ESA.

The previous CRS may be the CRS NFT 910 containing CRS before the CRS update. The target function is information on code containing a problem to be actually proved by ZKP. Since storing the original code significantly increases a storage cost, like the CRS information, the target function may include a hash value of the original code and an external storage placement in which the original is stored.

ZKP keys may be a proving key and a verification key that are generated on the basis of the target function and the CRS through the key generation module 830 of the calculation module 800. A referenced CRS may indicate a CRS NFT containing the CRS that is referenced to generate the ZKP keys.

At least one of the foregoing calculation module 800, CRS NFT 910, ZKP NFT 930, and NFT creation smart contract 950 may be installed in at least one communication node in the blockchain network. The communication node corresponds to a blockchain node. Such a communication node or blockchain node may be simply referred to as a "terminal" or "node." Also, for example, a blockchain node may be configured to include the calculation module 800, the CRS NFT 910, and the ZKP NFT 930.

In the foregoing embodiment, the calculation module 800 is illustrated as not being included in the node 100 or the like. However, the present disclosure is not limited to such a configuration, and at least one specific node in the blockchain network may include at least a part of the calculation module 800. In this case, the specific node may be indicated by a reference number of 100*a*.

Figure 5:
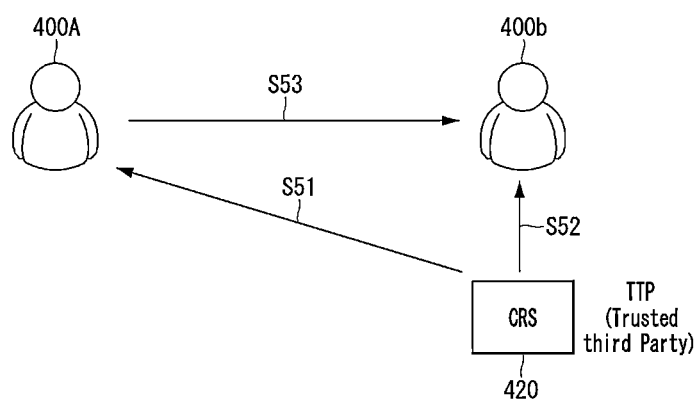
FIG. 5 is a schematic diagram illustrating a setup ceremony of a comparative example not using the trusted setup framework of FIG. 4.

FIG. 5 is a schematic diagram illustrating a setup ceremony of a comparative example not using the trusted setup framework of FIG. 4.

Referring to FIG. 5, in the comparative example, the prover 400*a* and the verifier 400*b* share a problem SC1 to be verified and a CRS 420 (S51 and S52). The CRS 420 is provided to the prover 400*a* and the verifier 400*b* through a trusted third party (TTP).

A proving key of the prover 400*a* and a verification key of the verifier 400*b* are separately generated on the basis of the shared CRS. Due to this configuration, when the problem SC1 to be verified is received from the prover 400*a* (S53), the verifier 400*b* verifies the problem using the verification key.

As described above, the comparative example necessarily requires the trusted third party to perform the trusted setup ceremony.

Figure 6:
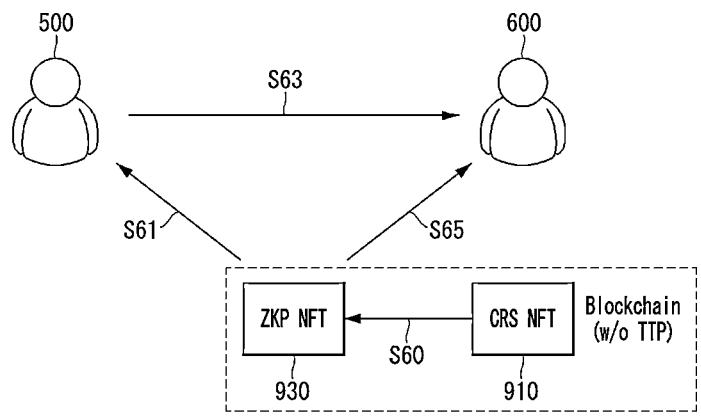
FIG. 6 is a schematic diagram illustrating a trusted setup ceremony that may be employed in the trusted setup framework of FIG. 4.

FIG. 6 is a schematic diagram illustrating a trusted setup ceremony that may be employed in the trusted setup framework of FIG. 4.

Referring to FIG. 6, the trusted setup method of the present embodiment does not require sharing information between a prover 500 and a verifier 600 in advance.

The prover 500 may obtain a CRS through a CRS NFT 910 connected to a ZKP NFT 930 (S60 and S61). Here, the CRS NFT 910 and the ZKP NFT 930 may be present in a blockchain network without any TTP.

The prover 500 may send a ZKP NFT ID of the problem SC1 to be verified to the verifier 600 (S63), and the verifier 600 receiving the ZKP NFT ID may recognize that the problem SC1 of the ZKP NFT 930 is a problem to be verified (S65).

The prover 500 and the verifier 600 do not need to respectively generate a proving key pk and a verification key vk and may use those (e.g., $pk_i^{SC1}$ and $vk_i^{SC1}$) stored in the ZKP NFT 930. As described above, in the trusted setup method of the present embodiment, a TTP is no longer required.

Figure 7:
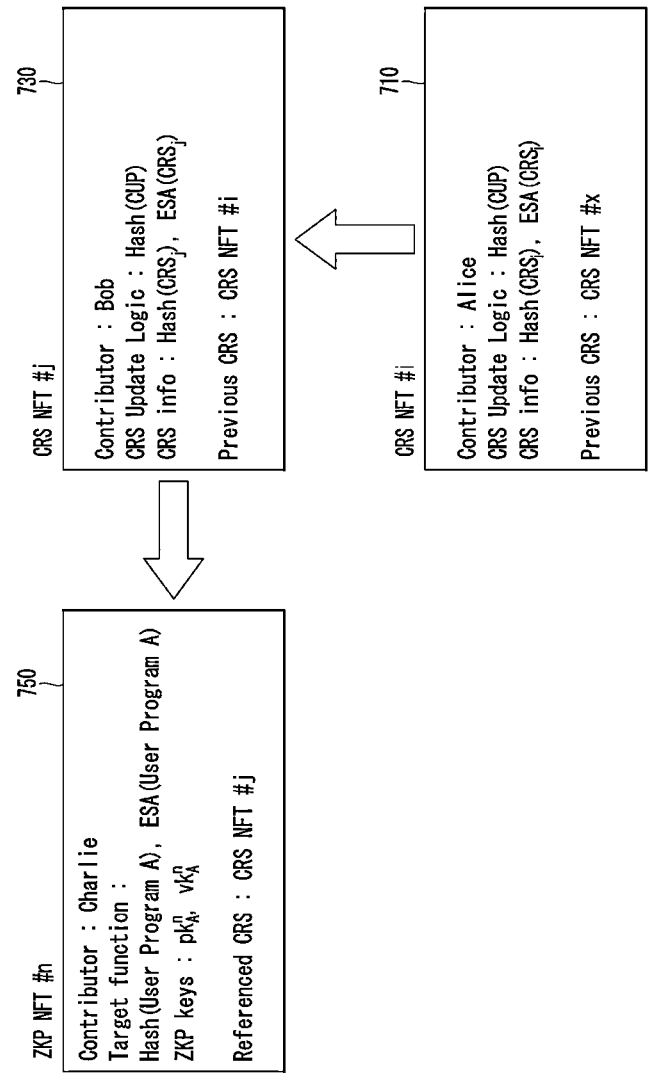
FIG. 7 is an example diagram illustrating a main operating principle of the trusted setup ceremony of FIG. 6.

FIG. 7 is an example diagram illustrating a main operating principle of the trusted setup ceremony of FIG. 6.

Referring to FIG. 7, a smart contract of a blockchain network may be configured to update a CRS NFT with a new CRS NFT and update a ZKP NFT when updating the CRS NFT. The smart contract may be implemented as a code segment or program that is executable by itself and implemented as a personal wallet or the like at a blockchain node or a communication node corresponding thereto. The blockchain node may be a node belonging to one of all networks that use ZKP. Such a smart contract may be referred to as a "CRS update smart contract."

More specifically, Alice, which corresponds to a blockchain node or communication node participating in the blockchain network, may request a CRS written as a smart contract from the blockchain network through a program (referred to as a "user program") used for CRS updates. Alice may update a CRS received from the blockchain network with a first CRS through a calculation module using its secret key. According to an update of the CRS, Alice may generate a first proving key and a first verification key to be used in ZKP through the calculation module and transmit the generated keys and the first CRS to the smart contract.

The blockchain network may update the CRS with the first CRS through a pairing check between the first CRS received from Alice and the CRS prestored in the smart contract. A proving key and a verification key stored in the smart contract may be updated with the first proving key and the first verification key, respectively. Here, a specific CRS NFT (hereinafter "CRS NFT #i") 710 may be generated and stored in the smart contract.

CRS NFT #i 710 may include CRS update-related information about who has performed the CRS update. For example, a specific node in the blockchain network may record "Alice" in a contributor field of CRS NFT #i 710 for storing information on an entity which has created a CRS NFT, store "Hash(CUP)" in a CRS update logic field for indicating program information used for a CRS update, store "Hash(CRS$_i$)" and "ESA(CRS$_i$)" in a CRS info field for indicating information on a stored CRS, and store CRS NFT #x information in a previous CRS field for indicating a CRS NFT containing a CRS before the update. CRS NFT #x may represent an $x^{th}$ CRS NFT (x is a random number).

The original code or program of a CUP may be stored in an external storage. In this case, a hash value Hash(CUP) of corresponding code data may be stored in the CRS update logic field instead of the original code or program of the code data. Since the CRS is updated through a CRS update module of the calculation module, the hash value may contain information on the CRS update module. The information on the CRS stored in the smart contract may include hash values of the placement of an external storage in which the original is stored, that is, an ESA, and the CRS.

Meanwhile, Bob, which corresponds to another blockchain node or communication node participating in the blockchain network, may request a CRS written as a smart contract from the blockchain network through the program used for CRS updates. Bob may generate a second CRS from the CRS received from the blockchain network through a calculation module using its secret key. Also, Bob may generate a second proving key and a second verification key to be used in ZKP and transmit the generated keys and the second CRS to the smart contract.

The blockchain network may update the first CRS with the second CRS through a pairing check between the first CRS which is received from Alice and prestored in the smart contract and the second CRS received from Bob. The first proving key and the first verification key stored in the smart contract may be updated with the second proving key and the second verification key, respectively. A specific CRS NFT (hereinafter "CRS NFT #j") 730 may be generated and stored in the smart contract.

CRS NFT #j 730 may include information about who has performed the CRS update. For example, a specific node may store "Bob" in a contributor field of CRS NFT #j 730, store "Hash(CUP)" in a CRS update logic field, store "Hash(CRS$_j$)" and "ESA(CRS$_j$)" in a CRS info field, and store CRS NFT #i information in a previous CRS field. CRS NFT #i may represent an $i^{th}$ CRS NFT.

Through the foregoing CRS NFT update, a ZKP NFT stored in a smart contract may be generated or updated. The generated or updated specific ZKP NFT may be referred to as "ZKP NFT #n."

ZKP NFT #n 750 may store ZKP-related information about who has generated a proving key pk and a verification key vk. For example, the specific node in the blockchain network may store "Charlie" in a contributor field of ZKP NFT #n 750 for storing information about who has created a ZKP NFT, store "Hash(UP)" and "ESA(UP)" in a target function field for indicating information on code actually containing a problem to be proved by a ZKP, store a proving key and a verification key in a ZKP key field, and store CRS NFT #j information in a referenced CRS field for indicating a CRS NFT containing a CRS which is referenced to generate a ZKP key. CRS NFT #j may represent a $j^{th}$ CRS NFT which is generated after the $i^{th}$ CRS NFT. "UP" in Hash(UP) and ESA(UP) is an abbreviation for "user program" and may indicate a specific user program such as user program A or the like.

Similar to the case of the CRS, the target function field may store a hash value of problem code and an ESA because storing the original code containing the problem without any change is burdensome in terms of storage cost and the like. The reason for storing this information is that it is necessary when other users want to verify that a ZKP key is generated correctly. In the ZKP key field, the proving key and the verification key may be indicated by $pk_A''$ and $vk_A''$, respectively.

Figure 8:
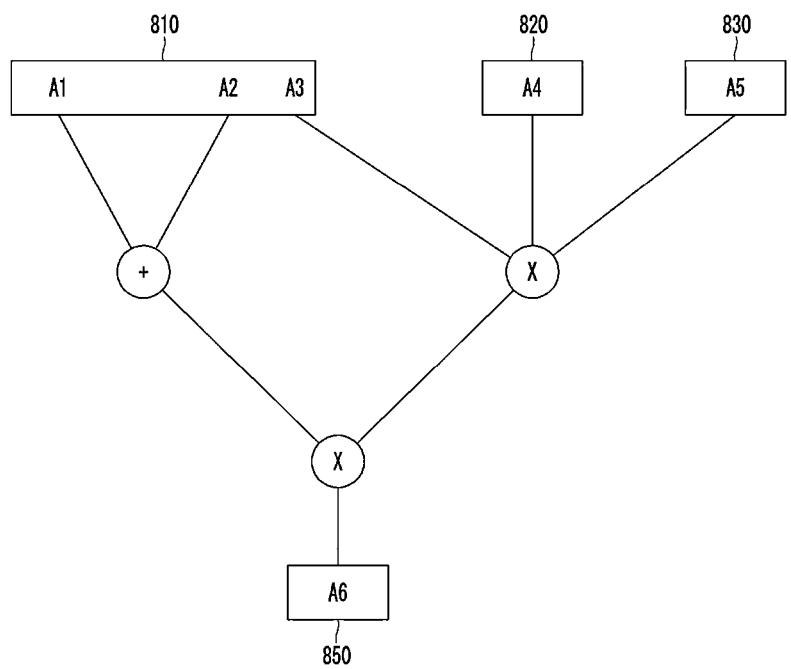
FIG. 8 is an example diagram illustrating a user program for ZKP that may be employed in the trusted setup ceremony of FIG. 6.

FIG. 8 is an example diagram illustrating a user program for ZKP that may be employed in the trusted setup ceremony of FIG. 6.

Referring to FIG. 8, a user program 800 calculates a result value A6 (850) through an addition or multiplication operation of first inputs A1, A2, and A3 (810), a second input A4 (820), and a third input A5 (830). The user program 800 may receive public keys corresponding to the first inputs 810 and the third input 830 and a secret key corresponding to the second input 830 and output the result value 850 corresponding to the relation between the public keys and the secret key. In the user program, A1, A2, A3, and A5 may be public keys, and A4 may be a secret key. Also, A5 may be a committed input.

According to the user program 800, an addition operation may be performed on A1 and A2, a multiplication operation may be performed on A3, A4, and A5, a multiplication operation may be performed again on the result of the addition operation of A1 and A2 and the result of the multiplication operation of A3, A4, and A5, and as a result, an output value A6 may be obtained.

A processor of a trusted setup device that executes the foregoing user program 800 may convert an arithmetic circuit for a user program into the form of a quadratic arithmetic program (QAP) and generate an SRC using the converted QAP.

Figure 9:
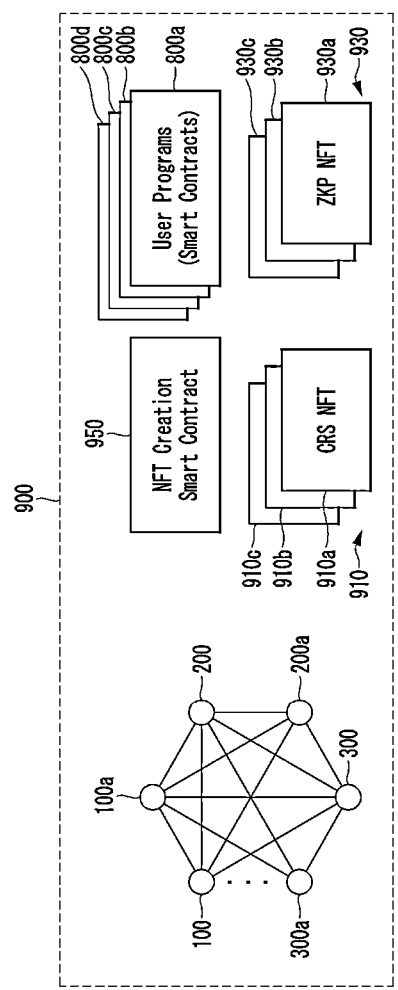
FIG. 9 is a schematic diagram illustrating a blockchain network that may be employed in the trusted setup ceremony of FIG. 6.

FIG. 9 is a schematic diagram illustrating a blockchain network that may be employed in the trusted setup ceremony of FIG. 6.

Referring to FIG. 9, a blockchain network 900 may include blockchain nodes 100, 100a, 200, 200a, 300, and 300a which are communication nodes that may access a specific blockchain through a network. Each blockchain node may share and store a transaction or smart contract generated through the blockchain network 900. When the verification of a transaction or smart contract is performed normally through a blockchain consensus algorithm, the blockchain nodes may store the transaction in a corresponding block or generate an NFT as recorded in the smart contract.

Also, in the blockchain network 900 of the present embodiment, the blockchain nodes may share CRS NFTs 910 (910a, 910b, and 910c) generated by at least one node, ZKP NFTs 930 (930a, 930b, and 930c), an NFT creation smart contract 950, and user programs 800a, 800b, 800c, and 800d in the form of a blockchain.

User programs distinguished from the NFT creation smart contract 950 may be implemented as, for example, a smart contract for claiming benefits of indemnity insurance or a personal wallet. In other words, some user programs may correspond to another smart contract including at least one of various existing smart contracts.

Each blockchain node may include a CRS NFT 910, a ZKP NFT 930, an NFT creation smart contract 950, a user program, or a combination thereof. Such a blockchain node may operate as at least one of a prover and verifier in different trusted setup ceremonies.

According to the foregoing configuration, when a blockchain network or a computing device of at least one node participating in the blockchain network has an NFT update smart contract or a similar smart contract, it may be assumed that nodes or a specific node participating in the blockchain network is using the trust setup ceremony of the present embodiment. Also, when a specific node participating in a blockchain network stores tokens that are similar in concept to CRS NFTs and ZKP NFTs, tokens that have a similar combination relation that mimics the correlations between CRS NFTS and ZKP NFTs, or ways of performing similar functions, the specific node may be presumed to use the trusted setup ceremony of the present embodiment.

Figure 10:
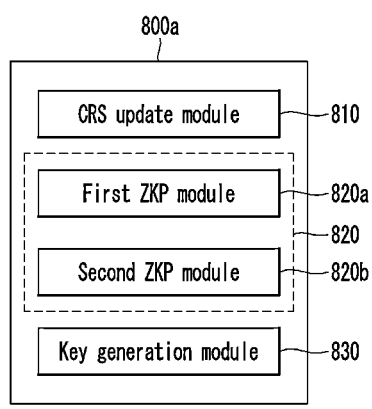
FIG. 10 is a schematic diagram illustrating a calculation module that may be employed in the trusted setup ceremony of FIG. 6 according to another example embodiment.

FIG. 10 is a schematic diagram illustrating a calculation module that may be employed in the trusted setup ceremony of FIG. 6 according to another example embodiment.

Referring to FIG. 10, a calculation module 800a may be configured to support both zk-SNARK and zk-STARK in ZKP. The calculation module 800a may include a CRS update module 810, a first ZKP module 820a, a second ZKP module 820b, and a key generation module 830.

The CRS update module 810 and the key generation module 830 are substantially the same as the CRS update module 810 and the key generation module 830 of the example embodiment described above with reference to FIG. 4. The first ZKP module 820a and the second ZKP module 820b may be included in a CRS ZKP module 820.

The first ZKP module 820a generates a ZKP using a proving key. The first ZKP module 820a may be referred to as a "ZKP generation submodule." More specifically, the first ZKP module 820a may generate a QAP from a problem to be verified, generate a solution to the QAP on the basis of a private input (see A4 820 in FIG. 8), and generate a ZKP on the basis of the solution.

In other words, the first ZKP 820a may perform zk-SNARK through computation, an algebraic circuit, a rank-1 constraint system (RICS), the QAP, linear probabilistically checkable proof (PCP), and linear interactive proof. Here, the zk-SNARK may refer to a procedure used to generate initial parameters for a trusted setup ceremony.

The RICS is a circuit or system that expresses all arithmetic circuits as rank-1 values, that is, values passing through only one gate. The QAP may represent RICS values according to an input, and the PCP may represent a proof for probabilistically verifying whether corresponding data is the solution to the problem.

According to the foregoing configuration, the first ZKP module 820a may generate a linear PCP, generate a linear interactive proof which is a question-and-answer sequence from the linear PCP, generate a non-interactive zero knowledge (NIZK) proof, and verify a target problem to be verified with the NIZK proof in a single conversation.

Meanwhile, the second ZKP module 820b verifies the ZKP using a verification key. The second ZKP module 820b may be referred to as a "ZKP verification submodule." More specifically, the second ZKP module 820b may convert the problem to be verified into a Reed-Solomon proximity testing (RPT) problem and generate an interactive oracle proof (IOP) through a fast Reed-Solomon interactive oracle proof of proximity (FRI) protocol rapidly solving the RPT problem.

To obtain the RPT problem and generate the IOP, the second ZKP module 820b may use algebraic intermediate representation (AIR) for placement and routing calculation, algebraic placement and routing (APR) for algebraic linking, and algebraic linking IOP (ALI) for proximity testing. This process may be similar to the arithmetic circuit, RICS, and QAP process of zk-SNARK.

When the second ZKP module 820b is used, a ZKP may be performed using only public parameters without a CRS. Such a function of the second ZKP module 820b may be installed as an auxiliary function in the trusted setup device in addition to the function of the first ZKP module 820a.

In the foregoing embodiment, the calculation module 800a may be implemented as at least one specific node participating in a blockchain network and at least one specific node belonging to the blockchain network. The CRS update module 810, the first ZKP module 820a, the second ZKP module 820b, and the key generation module 830 which are the components of the calculation module 800a may be disposed together in a single node. However, the present disclosure is not limited to this configuration, and the components of the calculation module 800a may be distributed across a plurality of nodes configured as different computing devices. For example, the CRS update module 810 may be disposed at node A, the first ZKP module 820a may be disposed at node B, the second ZKP module 820b may be disposed at node C, and the key generation module 830 may be disposed at node D.

Figure 11:
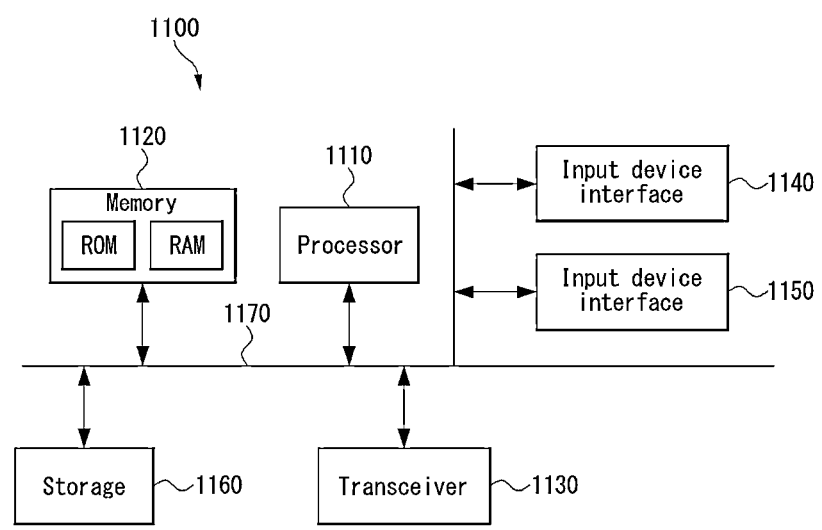
FIG. 11 is a schematic diagram illustrating a blockchain node that may be employed in a trusted setup device according to still another example embodiment.

FIG. 11 is a schematic diagram illustrating a blockchain node that may be employed in a trusted setup device according to still another example embodiment.

Referring to FIG. 11, a blockchain node 1100 may include at least one processor 1110 and a memory 1120. The blockchain node 1100 may be referred to as a "device for implementing a trusted setup protocol" or simply referred to as a "trusted setup device." Also, the blockchain node 1100 may further include a transceiver 1130 connected to a network to perform communication. Further, the blockchain node 1100 may include an input interface device 1140, an output interface device 1150, a storage 1160, and the like. The components included in the blockchain node 1100 may be connected through a bus 1170 and communicate with each other. The foregoing blockchain node 1100 may be applied to at least one of a user terminal, a computing device equipped with an external calculation module, and a communication node of a blockchain network.

The processor 1110 may execute program commands stored in at least one of the memory 1120 and the storage 1160. The processor 1110 may be a central processing unit (CPU), a graphics processing unit (GPU), or a dedicated processor for performing methods according to example embodiments of the present disclosure.

The program commands may include a command for configuring at least one software component for implementing a blockchain-based setup protocol of the present embodiment, a command for operating at least some components, a command for performing functions of at least some components, and the like. In the present embodiment, the program commands may include at least one command, code segment, or program for performing functions of a CRS update module, a first ZKP module, a second ZKP module, and a key generation module.

Each of the memory 1120 and the storage 1160 may be formed of at least one of a volatile storage medium and a non-volatile storage medium. For example, the memory 1120 may be formed of at least one of a read-only memory (ROM) and a random-access memory (RAM).

The transceiver 1130 may include a communication interface or a sub-communication system for connection to a local wireless network or a cable, communication with a satellite, wired or wireless communication with a general-purpose base station, an ideal backhaul link to a mobile edge core network or a core network, connection to a non-ideal backhaul link, or the like.

The input interface device 1140 may include at least one selected from among input devices including a keyboard, a microphone, a touchpad, a touch screen, and the like, and an input signal processing part which maps a signal input through the at least one input device to a prestored command or processes the signal.

The output interface device 1150 may include an output signal processing part which maps a signal output according to control of the processor 1110 to a prestored signal form or level and at least one output device which outputs a signal or information in the form of vibrations, light, or the like according to the signal of the output signal processing part. The at least one output device may be at least one selected from among output devices including a speaker, a display device, a printer, an optical output device, a vibration output device, and the like.

Meanwhile, in the foregoing embodiments, when nodes participating in a blockchain network process a trusted setup ceremony using a smart contract without any TTP, blockchain nodes can store a CRS NFT and a ZKP NFT or tokens that are similar in concept to CRS NFTs and ZKP NFTs. In this case, when components referred to as CRS NFTs and ZKP NFTs have the same concept as CRS NFTs and ZKP NFTs and follow the combination relation or correlations between CRS NFTS and ZKP NFTs, the components may be employed in various forms which are stored in a blockchain even if not NFTs. For example, when a smart contract is similar to an NFT creation smart contract, it is possible to create tokens having a similar concept to CRS NFTs and ZKP NFTs through the smart contract.

In the above case, blockchain nodes may be nodes in all networks that use ZKP, and may be referred to as "communication nodes," "nodes," "terminals," "user terminals," "computing devices," "server devices," "network devices," or the like. Blockchain nodes may also be configured to perform general functions that may be considered as being generally performed by a device having the corresponding name.

On the other hand, when a blockchain node only functions as a prover, the blockchain node may not have a ZKP verification submodule in a first ZKP module. Similarly, when a blockchain node only functions as a verifier, the blockchain node may not have a ZKP generation module in a first ZKP module. Also, when a blockchain node supports zk-SNARK but does not support zk-STARK, the blockchain node may not have a second ZKP module.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A blockchain-based trusted setup method for zero-knowledge proof (ZKP) performed by a specific node of a blockchain network, the method comprising:
    transmitting a first hash value of a first common reference string (CRS) to a first node;
    receiving a second hash value of a second CRS from the first node;
    transmitting the second hash value to a second node; and
    receiving a third hash value of a third CRS from the second node,
    wherein the second CRS is generated by the first node encrypting or hiding the first CRS acquired from a public storage through a CRS update module using a secret key of the first node,
    wherein the third CRS is generated by the second node using the second CRS acquired from the public storage and a secret key of the second node, and
    wherein the blockchain-based trusted setup method further comprises:
    when a result of a pairing check between a CRS obtained from the public storage and the first CRS is true, updating the CRS with the first CRS; and
    when the CRS is updated with the first CRS, creating a first CRS non-fungible token (NFT).

2. The blockchain-based trusted setup method of claim 1, further comprising, when the result of the pairing check between the CRS obtained from the public storage and the first CRS is true, updating, a proving key stored in the blockchain network, and a verification key stored in the blockchain network with a first proving key, and a first verification key, respectively.

3. The blockchain-based trusted setup method of claim 2, further comprising, when a result of a pairing check between the first CRS and the second CRS is true, updating the first CRS, the first proving key, and the first verification key with the second CRS, a second proving key, and a second verification key, respectively.

4. The blockchain-based trusted setup method of claim 3, further comprising, when a result of a pairing check between the second CRS and the third CRS is true, updating the second CRS, the second proving key, and the second verification key with the third CRS, a third proving key, and a third verification key, respectively.

5. The blockchain-based trusted setup method of claim 2, further comprising:
when the first CRS is updated with the second CRS, creating a second CRS NFT; and
when the second CRS is updated with the third CRS, creating a third CRS NFT.

6. The blockchain-based trusted setup method of claim 5, further comprising, when the second CRS is updated with the third CRS, creating a ZKP NFT,
wherein the ZKP NFT has information on a user program used for managing a proving key and a verification key for performing ZKP on the basis of the third CRS NFT and generating the proving key and the verification key.

7. The blockchain-based trusted setup method of claim 6, wherein the information on the user program includes an external storage address of an external public storage in which code for the CRS updates is stored.

8. The blockchain-based trusted setup method of claim 6, wherein the ZKP NFT further has a referenced CRS that is a field indicating a CRS NFT containing information on the CRS which is referenced to generate the proving key and the verification key or a placement of the CRS NFT.

9. The blockchain-based trusted setup method of claim 6, further comprising providing the ZKP NFT to a third node participating in the blockchain network,
wherein the third node acquires a ZKP NFT identification (ID) of a problem to be verified from a prover, which is a node participating in the blockchain network, recognizes that a specific problem defined in the ZKP NFT is the problem to be verified on the basis of the ZKP NFT ID, and verifies the specific problem using the verification key acquired from the ZKP NFT.

10. The blockchain-based trusted setup method of claim 9, wherein the verification key is generated from a target function and a specific CRS contained in the ZKP NFT, and
information on a CRS NFT containing the specific CRS which is referenced to generate the verification key is obtained from a referenced CRS contained in the ZKP NFT.

11. The blockchain-based trusted setup method of claim 10, wherein the information on the CRS NFT containing the specific CRS includes a hash value of the specific CRS and an external storage address of a public storage in which the problem to be verified is stored.

12. The blockchain-based trusted setup method of claim 6, further comprising generating, by a key generation module, the proving key and the verification key,
wherein the key generation module is available in the blockchain network or installed in the specific node and uses the third CRS and a circuit, which uses the user program or performs a function corresponding to the user program, to generate the proving key and the verification key.

13. A blockchain-based trusted setup method for zero-knowledge proof (ZKP) performed by a verifier, which is a specific node participating in a blockchain network, the method comprising:
acquiring an identification (ID) of a ZKP non-fungible token (NFT) containing a problem to be verified or information on the problem to be verified from a prover which is a first node participating in the blockchain network, wherein the verifier recognizes that a specific problem defined in the ZKP NFT of the blockchain network is the problem to be verified on the basis of the ZKP NFT ID;
acquiring a verification key from the ZKP NFT;
obtaining a common reference string (CRS) through a CRS NFT connected to the ZKP NFT; and
verifying the specific problem using the CRS and the verification key.

14. The blockchain-based trusted setup method of claim 13, wherein the verification key is generated from a target function contained in the ZKP NFT and the CRS, and
information on the CRS NFT containing the CRS, which is referenced to generate the verification key, is obtained from a referenced CRS included in the ZKP NFT.

15. The blockchain-based trusted setup method of claim 13, wherein the ZKP NFT further includes program information used for a CRS update, and
the program information includes an external storage address of an external public storage in which code for the CRS update is stored.

16. The blockchain-based trusted setup method of claim 13, wherein information on the CRS NFT containing the CRS includes a hash value of the CRS and an external storage address of a public storage in which code containing the problem to be verified is stored.

17. A blockchain node using a blockchain-based trusted setup method for zero-knowledge proof (ZKP), comprising a processor configured to execute at least one command,
wherein the at least one command causes the processor to perform operations of:
acquiring an identification (ID) of a ZKP non-fungible token (NFT) containing a problem to be verified or information on the problem to be verified from a prover which is a first node participating in a blockchain network, wherein a verifier recognizes that a specific problem defined in the ZKP NFT of the blockchain network is the problem to be verified on the basis of the ZKP NFT ID;
acquiring a verification key from the ZKP NFT;
obtaining a common reference string (CRS) through a CRS NFT connected to the ZKP NFT; and
verifying the specific problem using the CRS and the verification key.

18. The blockchain node of claim 17, wherein the ZKP NFT includes the verification key generated from a target function contained in the ZKP NFT and the CRS, information on a referenced CRS containing information on the CRS NFT containing the CRS referenced to generate the verification key, and information on a user program used for CRS updates.

19. The blockchain node of claim 18, wherein the information on the user program includes a hash value of the user program and an external storage address of an external public storage in which the user program is stored.

20. The blockchain node of claim 17, further comprising a calculation module connected through the blockchain network or installed in the blockchain node,
wherein the calculation module comprises at least one of a CRS update module, a key generation module, and a CRS ZKP module, when a result of a pairing check between a prestored CRS and a CRS received from a participant of the blockchain network is true, the CRS update module updates the prestored CRS with the received CRS, the key generation module generates a proving key for generating a ZKP proof and a verification key for verifying the ZKP proof, and the CRS ZKP module comprises at least one of a ZKP generation submodule for generating the ZKP proof using the proving key and a ZKP verification submodule for verifying the ZKP proof using the verification key.

* * * * *